(12) United States Patent
Kopang

(10) Patent No.: US 6,609,990 B2
(45) Date of Patent: Aug. 26, 2003

(54) POWER TRANSMISSION BELT AND METHOD

(75) Inventor: Craig Kopang, Bennett, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/908,235

(22) Filed: Jul. 18, 2001

(65) Prior Publication Data
US 2003/0017900 A1 Jan. 23, 2003

(51) Int. Cl.⁷ .................................................. F16G 5/10
(52) U.S. Cl. ........................................ 474/264; 474/260
(58) Field of Search ................................ 474/202, 237, 474/261, 263, 264

(56) References Cited

U.S. PATENT DOCUMENTS

| | | | |
|---|---|---|---|
| 3,416,383 A | | 12/1968 | Jensen et al. ................. 74/233 |
| 3,478,613 A | | 11/1969 | Waugh et al. ................ 74/233 |
| 3,820,409 A | | 6/1974 | Meadows ..................... 74/233 |
| 3,941,005 A | | 3/1976 | Gardiner, III et al. ........ 74/233 |
| 3,996,813 A | * | 12/1976 | Henderson et al. ......... 474/238 |
| 4,078,443 A | * | 3/1978 | Warner et al. .............. 474/264 |
| 4,177,688 A | * | 12/1979 | Howerton et al. .......... 474/238 |
| 4,359,355 A | | 11/1982 | Stecklein et al. ........... 156/138 |
| 4,392,842 A | | 7/1983 | Skura et al. ................. 474/205 |
| 4,415,397 A | * | 11/1983 | Wetzel ....................... 474/263 |
| 5,531,649 A | | 7/1996 | Osako et al. ............... 474/205 |
| 5,733,399 A | | 3/1998 | Wood | 
| 5,779,584 A | * | 7/1998 | Noguchi ..................... 474/264 |

* cited by examiner

Primary Examiner—William C Joyce
Assistant Examiner—Timothy McAnulty
(74) Attorney, Agent, or Firm—J. A. Thurnau, Esq.; C. H. Castleman, Esq.; S. G. Austin, Esq.

(57) ABSTRACT

The invention comprises a belt having a plied construction overlying tensile cords. An elastomeric layer overlies an overcord which overlies yet another elastomeric layer which in turn overlies a tensile cord. The overcord layer supports the tensile cords during molding thereby stabilizing a cord-line centerline position with respect to a rib apex. This construction significantly reduces a distance from a tensile cord centerline to a rib apex and rib/pulley interface in a multi-ribbed belt, thereby significantly increasing belt life.

13 Claims, 4 Drawing Sheets

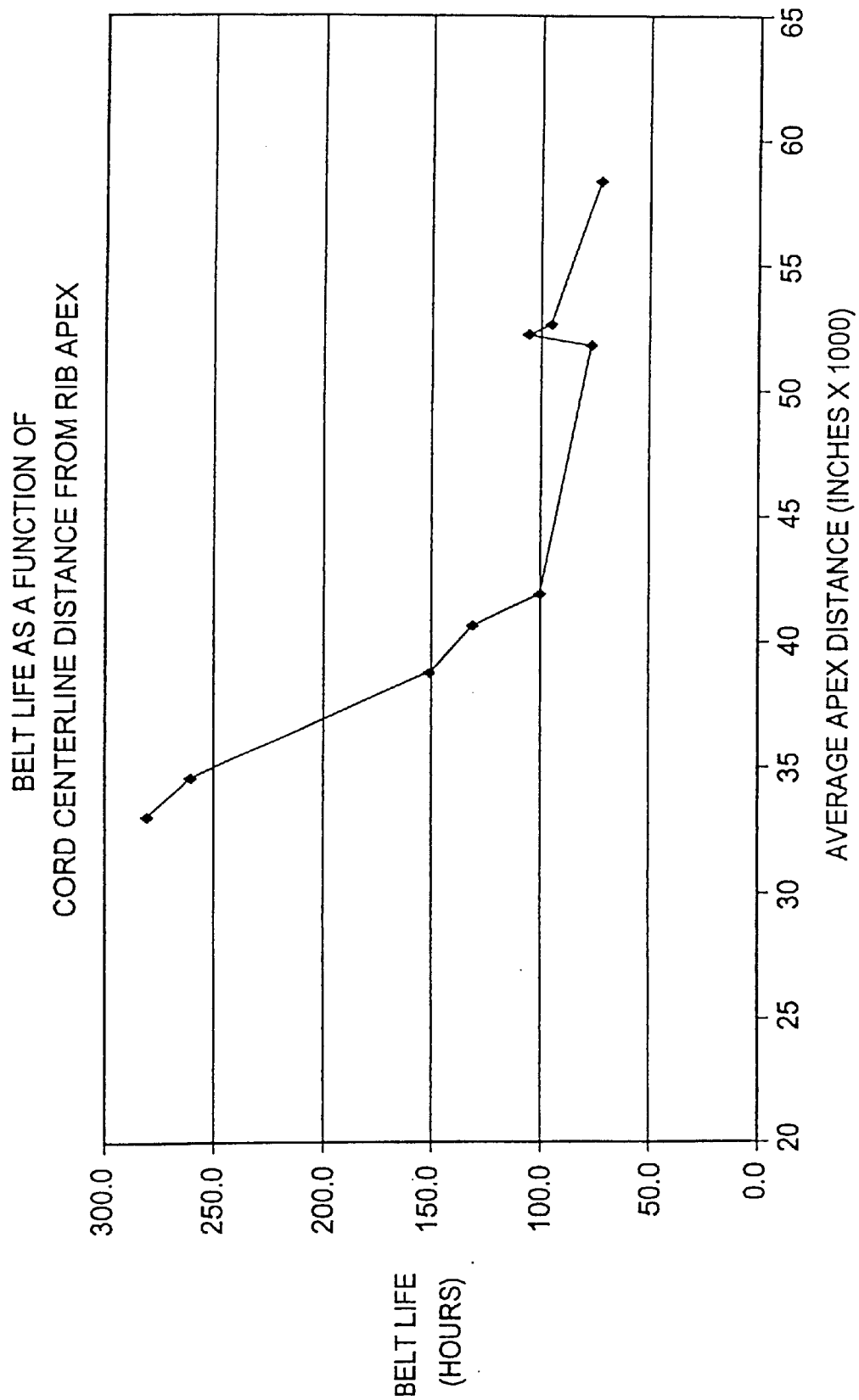

POWER TRANSMISSION BELT AND METHOD

FIELD OF THE INVENTION

The invention relates to power transmission belts having a low cordline and a method of producing same.

BACKGROUND OF THE INVENTION

It is known in the art to make power transmission belts from elastomeric materials having an embedded tensile member. The belts may describe a multi-rib, toothed or v type profile. The belts run in pulleys having a cooperating profile.

It is known that the tensile cord in power transmission belts is generally disposed in an elastomeric matrix. In particular, on multi-ribbed belts the tensile members are disposed in the body of the belt. This form of construction places an increased lever arm on the belt rib which is supported by the tensile members. The amount of force exerted is in direct proportion to the radial distance from the center of the tensile cord line to the bearing surface of the mating pulley. A longer lever arm length diminishes the operating life of the belt.

The method of fabrication of the belt determines, in part, the location of the tensile cord. In the case of ground belts, a belt slab is molded and vulcanized on a mandrel. The belt slab is then removed and the multi-rib profile is then ground into the belt slab. Since the grinding operation cannot be completely controlled, some allowance must be made in the location of the tensile cord to prevent it from being cut by the grinding operation. This results in the tensile cord line being a larger than preferred distance from a rib apex.

Representative of the art is U.S. Pat. No. 3,820,409 to Meadows which discloses a v-belt having a plurality of closely spaced supporting cords arranged transverse to and on at least one side of the load carrying cord.

What is needed is a belt having a significantly reduced distance from a tensile cord to a rib apex. What is needed is a belt having a significantly reduced distance from a tensile cord to a rib/pulley interface. What is needed is a belt having an overcord layer disposed in an elastomeric layer overlying a tensile cord for controlling a tensile cord location during molding. The present invention meets these needs.

SUMMARY OF THE INVENTION

The primary aspect of the invention is to provide a power transmission belt having a significantly reduced distance from tensile cord to a rib apex.

Another aspect of the invention is to provide a power transmission belt having a significantly reduced distance from a tensile cord to a rib/pulley interface.

Another aspect of the invention is to provide a power transmission belt having an overcord layer disposed in an elastomeric layer overlying a tensile cord for controlling a tensile cord location during molding.

Other aspects of the invention will be pointed out or made obvious by the following description of the invention and the accompanying drawings.

The invention comprises a belt having a plied construction overlying tensile cords. An elastomeric layer overlies an overcord which overlies yet another elastomeric layer which in turn overlies a tensile cord. The overcord layer supports the tensile cords during molding thereby stabilizing a cordline position. This construction results in a significantly reduced distance from a tensile cord centerline to a rib apex and rib/pulley interface in a multi-ribbed belt.

BRIEF DESCRIPTION OF THE DRAWINGS

FIG. 3 is a chart of test results for the inventive belt.

DETAILED DESCRIPTION OF THE PREFERRED EMBODIMENT

Figure 1:
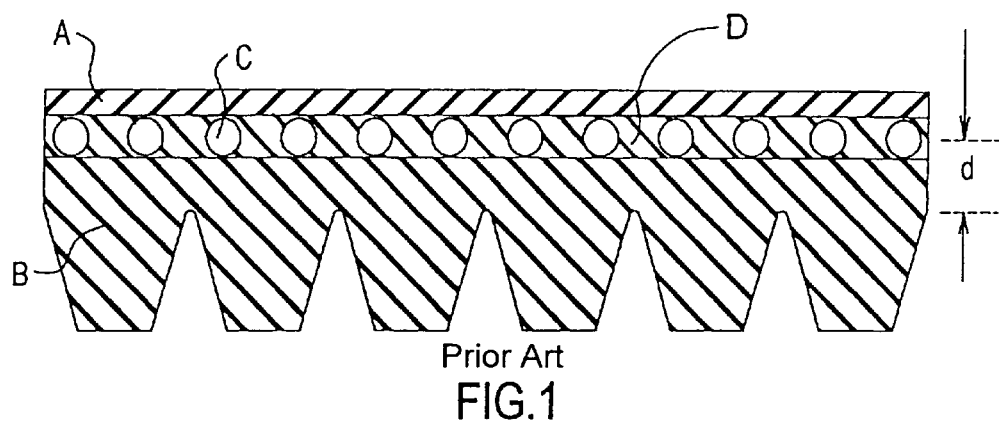
FIG. 1 is a cross-sectional view of the prior art.

FIG. 1 is a cross-sectional view of the prior art. The prior art construction comprises an overcord A, undercord B and tensile cords C. The cord line is shown at a given distance d from an apex of a multi-ribbed profile. The cordline must be at a sufficient distance d from the rib apex to avoid being damaged when the multi-rib profile is ground into the belt.

Figure 2:
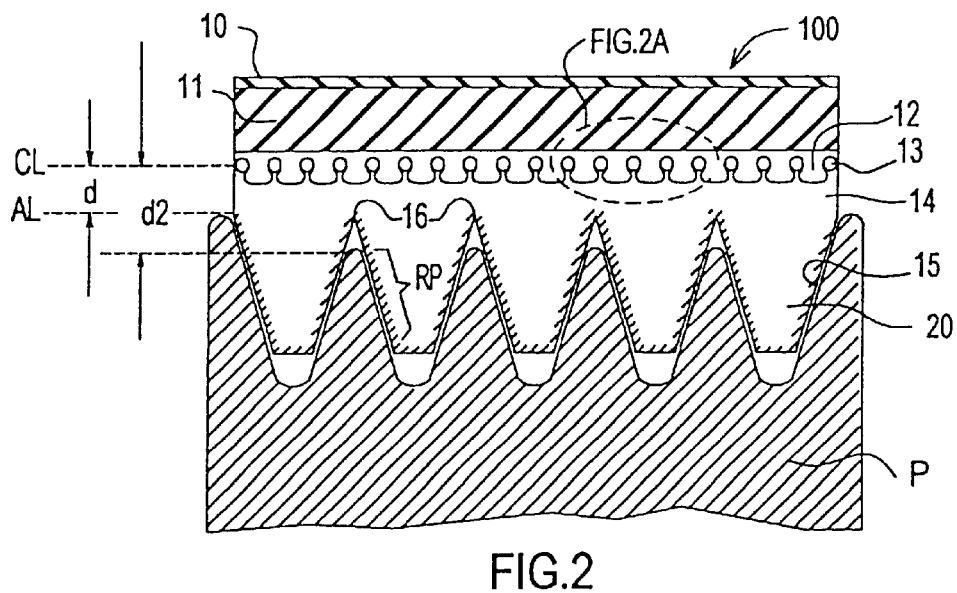
FIG. 2 is a cross-sectional view of the inventive belt.

FIG. 2 is a cross-sectional view of the inventive belt. Belt 100 comprises a plurality of layers. Undercord 14 comprises a multi-ribbed profile in the preferred embodiment. In operation, belt 100 engages pulley P.

More particularly, layer 10 comprises gum or fiber-loaded elastomeric material. Overcord or cross-cord 11 comprises a cross-cord layer. The cross-cord layer supports tensile cord 13 during the molding and curing process, maintaining a proper cordline location within the belt body. Cross-cord 11 may comprise woven or non-woven material.

Cross-cord layer 11 is substantially non-porous, preventing a significant amount of layer 10 from penetrating through layer 11 during the molding process. This has the effect of layer 11 supporting tensile cord 13 thereby controlling a tensile cord centerline CL location.

A thin layer of gum 12 is applied between layer 11 and the tensile cord 13. Cords 13 extend along a longitudinal axis of the belt. Although in the preferred embodiment the gum 12 layer is applied between layer 11 and tensile cords 13, gum 12 may also be applied between tensile cords 13 and undercord layer 14 so long as cords 13 are encapsulated by gum 12 during molding. Undercord 14 comprises an elastomeric material having a fiber loading. In an alternate embodiment it may also comprise pure elastomeric without fiber loading. The fiber loading for layer 10 and 14 may be in the range of 0.1 to 20 parts per hundred. The fibers may comprise any known in the art, including by way of example cotton, PTFE, and aramid.

Jacket 15 may comprise woven or non-woven material in order to establish a coefficient of friction.

Manufacturing.

The inventive belt is constructed in a process of sequential application of each layer on a build drum. The belt is fabricated by molding using an expanding membrane that presses the belt slab into a ribbed outer shell. In this process the belt is built-up on a mandrel having an expandable member on the surface of the mandrel. During molding and curing the expandable member presses the belt build into an outer shell mold. Use of the cross-cord overcord ply 11 stabilizes the tensile cordline 13 position, resulting in a precisely controlled cordline position. This allows the tensile cord 13 to be placed closer to a rib apex 16, and thereby closer to a rib/pulley interface RP significantly increasing operating life. By comparison, prior art cordlines are at a greater distance from a rib apex and rib/pulley interface, resulting in a shorter operational life.

In particular, a first elastomeric layer 10 of a gum elastomeric or fiber-loaded material is plied on the mandrel. Next, a cross-cord layer 11 is applied. Due to the flow characteristics of the gum during molding, the cross-cord layer 11 can be butt-spliced by stitching the ends of the ply together or left with a gap as described in FIG. 9.

Next, a second elastomeric layer comprising a thin ply of gum stock 12 is applied over the cross-cord ply 11. Layer 12 is solely made of rubber stock in the preferred embodiment. Next, the tensile members or cords 13 are wound over the gum stock ply. Next, the third elastomeric layer comprising a fiber-loaded undercord ply 14 is applied. Finally, a ply of non-woven material 15 is applied to the surface of the undercord ply. Non-woven material 15 may comprise cellulose or non-cellulose based materials.

Use of the build and process results in the final cord position remaining stable and significantly closer to a rib apex 16 and rib/pulley interface RP. In particular, during the inverted molding operation the belt build, and cord 13 in particular, is spiraled onto an expanding membrane positioned in a build drum. During molding the expanding membrane or bag pushes the belt build into the mold shell ribs.

In the prior art during a forming sequence the cord 13 tended to either distort or pull down into the first available support layer. The resulting misalignment of the cords caused them to have differing loads, thereby decreasing the operational life.

In the inventive belt and process, the support to prevent this occurrence is provided by cross-cord layer 11. In this manner the cord 13 is supported causing cordline CL to be placed more precisely and closer to the rib/pulley interface RP.

This construction also has a significant advantage over the fabrication method wherein a belt profile is ground into the cured belt build. In the case of a ground belt the cord line must be located a greater distance from a rib apex 16 to avoid having the cord inadvertently damaged by the grinding operation. In the instant molded construction, the cord line is much closer to the apex.

Figure 6:
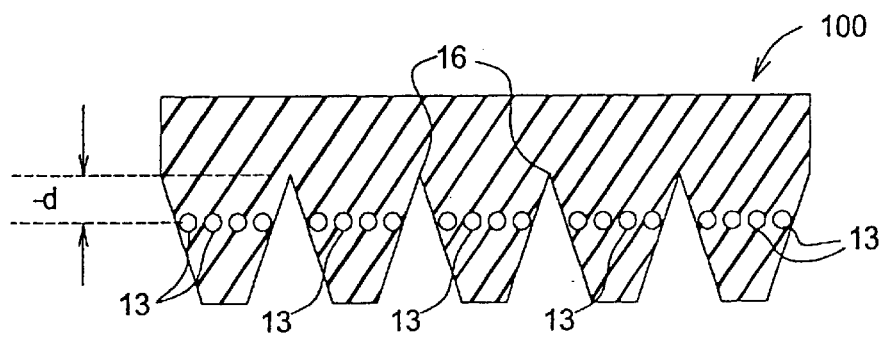
FIG. 6 is a cross-sectional view of a -d dimension.

The disclosed construction of the inventive belt places cordline CL at a lesser radial distance d above a rib apex 16 and rib/pulley interface RP (d2) as compared to prior art belts. Positioning the cordline in this manner provides superior dynamic performance, see FIG. 3. The range of radial distance d in the inventive belt is such that an outer surface of the cord 13 is approximately 0.000" to 0.050" above the rib apex 16. It is also possible for the cordline distance d to be negative such that an outer surface of the cord is below the rib apex, effectively placing cord 13 partially or totally within the ribs, see FIG. 6. The distance of a cord centerline relative the rib apex is in the approximate range of −0.040" to 0.000". The negative value, for example, −0.040", indicates the cord is "below" the rib apex such that the cord is set within the ribs, see FIG. 6, a cross-sectional view of a -d dimension.

In the preferred embodiment the range of d is approximately between 0.010" and 0.015" above the rib apex for a cord 13 having a diameter of approximately 0.040". In the case where radial distance d is equal to 0.020", a tensile cord 13 is at the surface of layer 14 at a rib apex 16. The cord diameter given herein is for illustrative purposes only and may be varied depending upon the needs of a user and operating conditions of the belt.

As previously noted, the disclosed construction of the inventive belt has the effect of reducing a distance d2 from a rib/pulley interface RP to the belt cordline CL. Reduction of distance d2 causes a reduction of the magnitude of the deflection of the rib as the belt engages a pulley. More particularly, during operation as a belt engages a pulley the rib elastomeric material deflects in response to the torque being transmitted to the pulley. The deflection is along a longitudinal axis and is relative to a point on the tensile cord. See FIG. 7.

Figure 7:
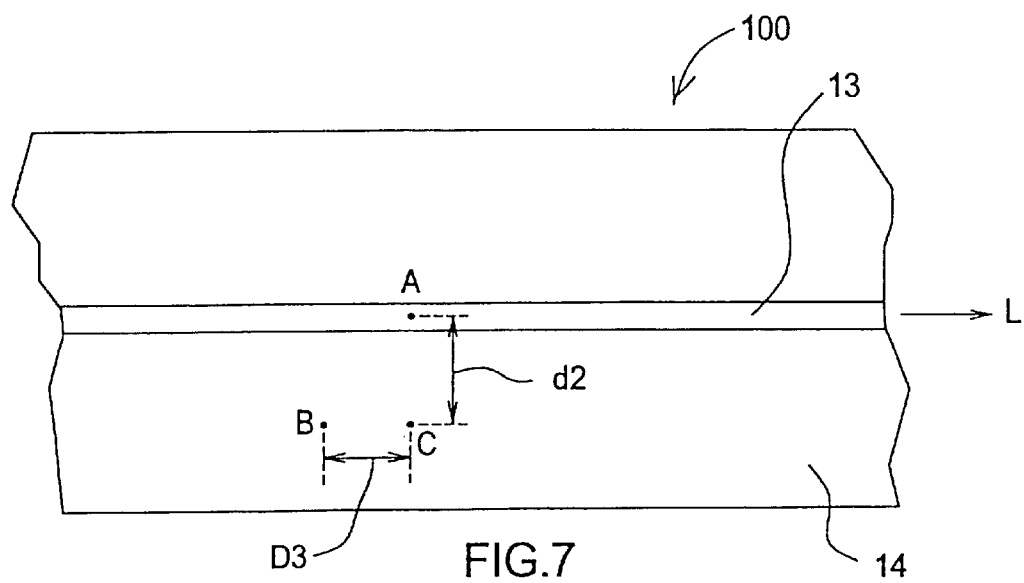
FIG. 7 is a side view of a belt section.

FIG. 7 is a side view of a belt section. A represents a point on a tensile cord 13. C represents a point on a pulley engaging surface of a rib 14. When the belt under load L engages a pulley (not shown), rib 14 deflects such that point C moves to point B through a distance D3. The magnitude of distance D3 is a function of d2 as described herein. As d2 is increased, so is D3. Conversely, as d2 is decreased, D3 is decreased. Excessive deflection, D3, causes premature belt failure by rib cracking. Reduction of deflection D3 during operation by significantly reducing d2 significantly increases the life span of the inventive belt.

Figure 2A:
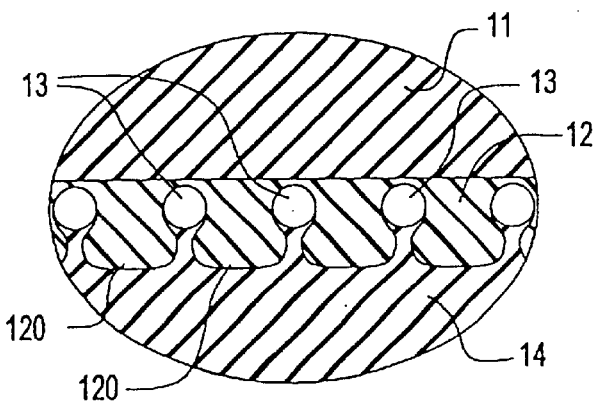
FIG. 2A is a detail of FIG. 2 after the molding operation.

FIG. 2A is a detail of FIG. 2. The belt cross-section is such that elastomeric layer 12 has been pressed between and through the tensile cords 13 forming lobes 120. Lobes 120 run parallel to and along a length of the tensile cords, substantially parallel to a longitudinal axis. Layer 11 is also pressed adjacent to the tensile cords and bears upon a thin remaining portion of layer 12 upon cords 13. Lobes 120 comprise elastomeric from layer 12. Lobes 120 provide support and cushion for the cords during operation.

FIG. 3 is a chart of test results for the inventive belt. As shown in FIG. 3, reducing the average distance between a rib apex 16, and thereby rib/pulley interface RP, and the cordline CL significantly increases belt life. For example, belt life for a belt having an average tensile cord centerline to rib apex radial distance d of approximately 0.042" is 100 hours as compared to 280 hours for a belt having an average tensile cord centerline to rib apex radial distance d of approximately 0.032".

Figure 4:
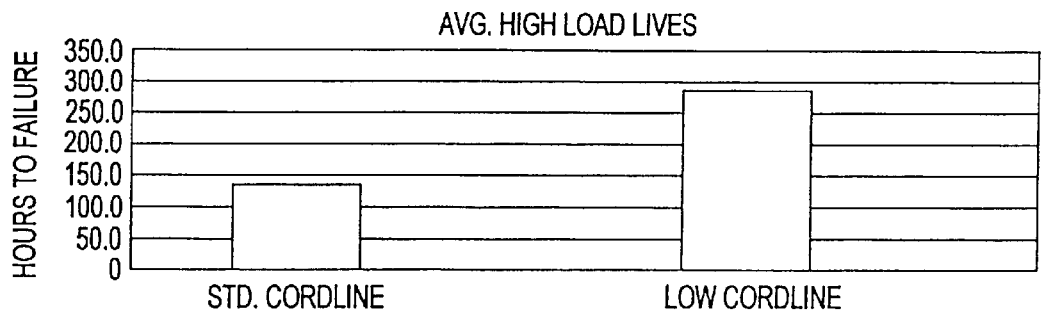
FIG. 4 depicts high load life test results for the inventive belt.

FIG. 4 depicts high load life test results for the inventive belt. The inventive belt exhibited significantly improved high load life. The high load test comprises running a belt at approximately 4900 RPM under approximately 264 pounds total tension at a temperature of approximately 85°. The inventive belt operated approximately 280 hours to failure while a belt having a higher cordline location operated less than 150 hours to failure, an improvement of 86%.

Figure 5:
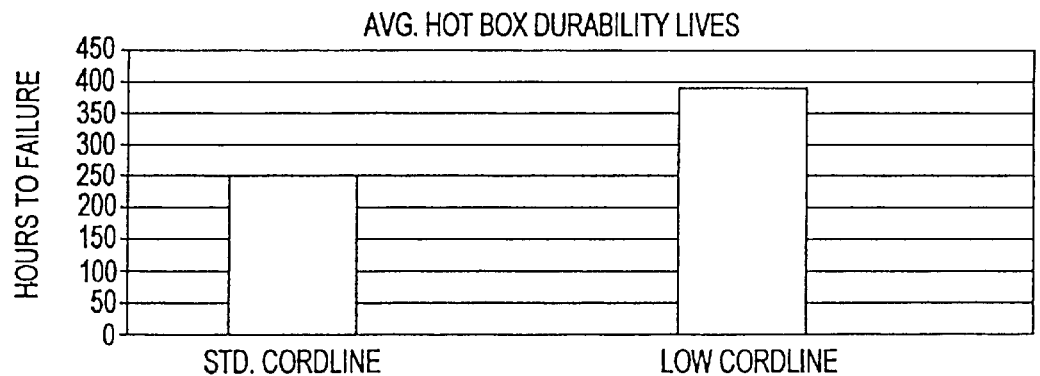
FIG. 5 depicts a high temperature durability life for the inventive belt.

FIG. 5 depicts a high temperature durability life for the inventive belt. The inventive belt exhibits significantly improved high temperature durability. The high temperature durability test comprises a running a belt on a three point drive at approximately 13000 RPM under approximately 282 pounds total tension at a temperature of approximately 250° F. The inventive belt operated approximately 390 hours to failure while a belt having a standard cordline operated 250 hours to failure, an improvement of 56%.

Figure 8:
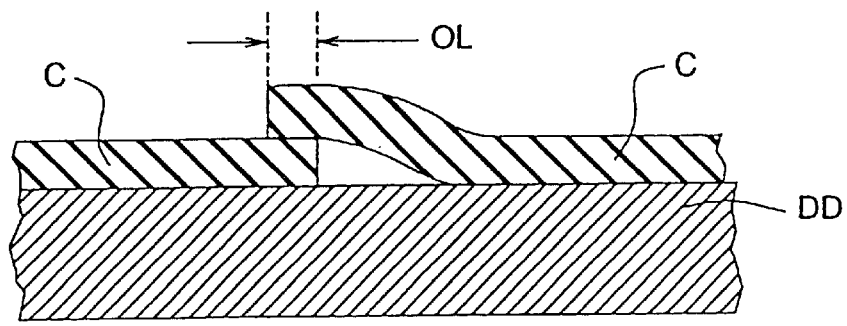
FIG. 8 depicts conventional overcord construction.

FIG. 8 depicts conventional overcord construction. Overcord layer C is joined at a lap joint. An end of the lap joint overlays the lower portion by an amount OL. This "high spot" creates a bump that can cause noise during operation in the case of use of the belt with a backside idler.

Figure 9:
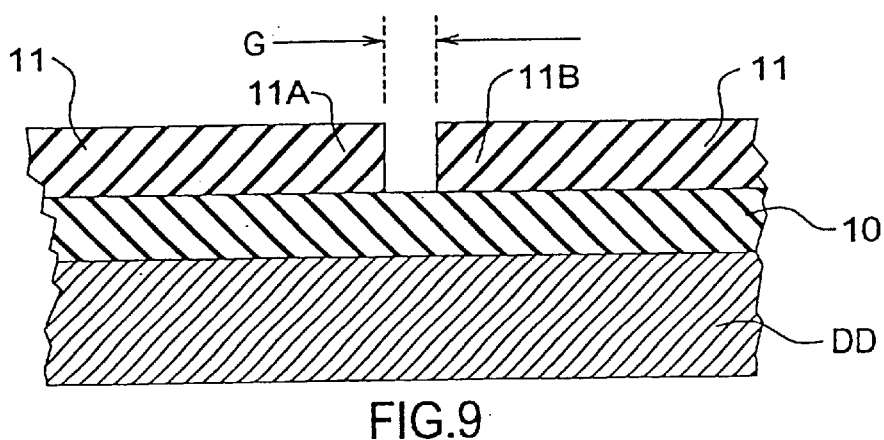
FIG. 9 depicts overcord construction for the inventive belt.

FIG. 9 depicts overcord construction for the inventive belt. As described elsewhere in this specification, layer 10 overlays cross-cord layer 11. D depicts the build drum upon which the belt is layed-up during fabrication as described elsewhere in this specification. Ends 11A and 11B of layer 11 may be configured in a butt splice and/or stitched to each other. However, in the preferred embodiment, during fabrication on the build drum a slight gap G may be present between the ends 11A and 11B, allowing an end 11A to be stitched into layer 10 instead of to the opposite end 11B. During vulcanization, the material of layer 10 then flows together across the gap creating a seamless joint. A seamless joint eliminates any noise that might be caused by the belt traveling over a backside idler. Consequently, fabricating the belt with a gap on the overcord is an improvement over a prior art belt where a gap on the overcord layer would cause noise in the case of use of a backside idler because the prior art belts require the ends of the overcord layer to be closely controlled. The inventive belt does not require the ends of layer 11 to be precisely cut and layed-up also resulting in decreased fabrication costs.

Although a single form of the invention has been described herein, it will be obvious to those skilled in the art that variations may be made in the construction and relation of parts without departing from the spirit and scope of the invention described herein.

I claim:

1. A belt comprising:

an elastomeric body having an undercord, the undercord having a profile;

a plurality of tensile members disposed in the elastomeric body in a longitudinal direction;

a crosscord layer disposed in the elastomeric body opposite the profile with respect to the tensile members; and the elastomeric body having an elastomeric layer disposed between the crosscord layer and the tensile members, the elastomeric layer having a lobe disposed between each tensile member.

2. The belt as in claim 1, wherein the crosscord layer is substantially non-porous.

3. The belt as in claim 1, wherein the undercord further comprises a fiber loading.

4. A belt comprising:

a first elastomeric layer;

a first cross-cord layer bonded to the first elastomeric layer;

tensile members extending along a longitudinal axis of the belt;

a second elastomeric layer bonded to the cross-cord layer and overlaying the tensile members and extending between the tensile members forming lobes disposed between the tensile members and a rib apex, the lobes being substantially parallel to the tensile members; and a third elastomeric layer bonded to the second elastomeric layer having a profile.

5. The belt as in claim 4 further comprising a fiber loading in the first elastomeric layer.

6. The belt as in claim 4 further comprising a fiber loading in the third elastomeric layer.

7. The belt as in claim 6, wherein the second elastomeric layer is solely made of rubber.

8. The belt as in claim 6 further comprising a multi-ribbed profile.

9. A belt comprising:

a first elastomeric layer;

a substantially non-porous cross-cord layer disposed between the first elastomeric layer and a second elastomeric layer;

tensile members extending along a longitudinal axis of the belt;

the second elastomeric layer bonded to the cross-cord layer and the second elastomeric layer comprising lobes disposed between the tensile members and a rib apex; and a third elastomeric layer bonded to the second elastomeric layer having a profile.

10. The belt as in claim 9 wherein the third elastomeric layer further comprises a fiber loading.

11. The belt as in claim 9, wherein the third elastomeric layer is solely made of rubber.

12. The belt as in claim 9, wherein the crosscord layer further comprises woven material.

13. The belt as in claim 9, wherein the crosscord layer further comprises non-woven material.

* * * * *